United States Patent [19]

Wyndham

[11] 4,083,927
[45] Apr. 11, 1978

[54] CONTROLLED CARBO-CHLORINATION OF KAOLINITIC ORES

[75] Inventor: Ronald Wyndham, New Orleans, La.

[73] Assignee: Toth Aluminum Corporation, New Orleans, La.

[21] Appl. No.: 737,798

[22] Filed: Nov. 2, 1976

[51] Int. Cl.$^2$ .......................... C01F 7/56; C01F 7/58
[52] U.S. Cl. .................................. 423/136; 423/135; 423/137; 423/495; 423/341; 75/113
[58] Field of Search ............... 423/135, 136, 341, 495, 423/137, 343; 75/112, 113

[56] References Cited
U.S. PATENT DOCUMENTS

| | | | |
|---|---|---|---|
| 1,866,731 | 7/1932 | Staib | 423/136 |
| 2,832,668 | 4/1958 | Cullierson et al. | 423/136 |
| 3,956,454 | 5/1976 | Nemecz et al. | 423/136 |

OTHER PUBLICATIONS

Seferovich, "Chemical Abstracts," vol. 29, 1935, 1213(9).
Krech, "Journal of General Chemistry, USSR," vol. 7, 1937, pp. 1249-1263.

Primary Examiner—Herbert T. Carter
Attorney, Agent, or Firm—Holman & Stern

[57] ABSTRACT

A novel improvement in the process for the carbo-chlorination of kaolinitic ores is provided wherein the improvement comprises adding catalytic amounts of boron chloride to the carbo-chlorination step which results in the catalyzed and controlled chlorination of alumina and silica. Preferably, about 0.3 to 5.0 percent of boron chloride per volume of chlorine is added to the chlorination step and in combination with from 5 to 40 percent or more of reductant carbon to provide a conjoint action wherein preferential chlorination of alumina over silica is obtained at low levels of boron chloride and reductant and total chlorination of both alumina and silica are obtained at high boron chloride and reductant levels.

8 Claims, No Drawings

CONTROLLED CARBO-CHLORINATION OF KAOLINITIC ORES

BACKGROUND OF THE INVENTION

The present invention relates to the controlled production of aluminum chloride and silicon chloride in the carbo-chlorination of kaolinitic ores. Kaolinitic ore is defined as an ore containing a substantial proportion of kaolin. More specifically, the instant invention is primarily concerned with the rapid and preferential carbo-chlorination of alumina over silica in the kaolinite in the ore, by controlling the levels of boron chloride and reductant present during the carbo-chlorination step.

PRIOR ART

There have been some references in the prior art to the carbo-chlorination of kaolinitic ores. A distinct characteristic disadvantage of these prior art techniques, however, is the fact that silicon tetrachloride is normally produced at essentially the same rate and yield as aluminum chloride. This imposes a considerable economic burden upon these processes for the following reasons: (a) carbon is consumed in the carbo-chlorination of the silica; (b) the silicon tetrachloride is very volatile so it ordinarily would be recovered by costly refrigeration of the gases; and (c) the recovery of chlorine from the silicon tetrachloride by oxidation with oxygen is an expensive step. These prior art limitations have been recognized and are evident by the fact that there has been no commercially practiced process for producing aluminum chloride from kaolinitic ores such as clay.

There have been efforts, however, to develop carbo-chlorination processes wherein the chlorination of silica is suppressed. See, for example, U.S. Pat. No. 1,866,731 and British Pat. No. 305,578, which describe processes for the preferential carbo-chlorination of alumina over silica in clay by recycling large amounts of silicon chloride with the chlorine which is taught as suppressing the formation of additional silicon chloride. This prior art has apparently never been used commercially, presumably because it appears to be inoperative according to actual laboratory tests and, even if workable, such processes would require heavy capital costs which must be borne for refrigeration and other equipment to cool the product gases to the very low temperatures necessary to condense out and thus separate and recycle the volatile silicon chloride.

The prior art further discloses, in various forms and fashions, the use of alkali metal compounds as catalysts for the carbo-chlorination of aluminous ores. For example, in an article by Ya. E. Seferovich, J. Chem. Ind. (Moscow) 1934, N. 10, 62-64, the use of alkali metal salts like sodium tetraborate is taught as catalyst during clay carbo-chlorination. This and the other prior art does not teach, however, the use of boron chloride gas or boron oxide as a catalyst for clay carbo-chlorination, nor has it been recognized that the control of the ratio of alumina versus silica in carbo-chlorination of clay is possible through control of the amounts and ratio of the reductant to boron chloride and their synergistic action.

SUMMARY OF THE INVENTION

A primary object of the present invention is to provide a carbo-chlorination process for the controlled chlorination of alumina over silica in kaolinitic ores to produce aluminum chloride by substantially increasing the ratio of alumina chlorination to silica chlorination and while maintaining a rapid reaction rate and good percentage of conversion of alumina.

Secondarily, by adjusting the reaction conditions, the silica can be chlorinated in amounts from close to zero up to about equal to that of the chlorination of the alumina.

The aluminum chloride can be subsequently electrolyzed to aluminum metal; or used to make aluminum metal by the Toth Aluminum Process, or readily oxidized to aluminum oxide and thereafter converted to aluminum metal pursuant to the present well known Hall commercial process, or it can be sold as such for many other uses.

A further advantage of the present invention is that it allows recycling of the gaseous boron chloride carbo-chlorination catalyst by reacting it with clay and/or reductant, or by dissolving it in solvents like $TiCl_4$ followed by vaporization and collection of the $BCl_3$ vapors.

A further object is to permit the utilization of low grade bauxite or inexpensive and domestically available kaolinitic ore like clay for producing aluminum chloride in a manner which is quicker, less expensive, and does not rely upon imported ores as compared to the traditional Bayer process.

Another advantage of this invention is the energy savings from: (1) the unexpected important reduction in carbon consumption through the preponderant production of $CO_2$ instead of CO; (2) in the satisfactory use of lower carbo-chlorination temperature; and (3) the reduction in carbo-chlorination of silica with attendant reduction in carbon consumption and refrigeration-condensation of $SiCl_4$.

DESCRIPTION OF PREFERRED EMBODIMENTS

The controlled carbo-chlorination of alumina and silica in kaolinitic ores is achieved by adjusting the levels of reductant between about 5% and 40% or more by weight of dry clay and the level of boron chloride between 0.3% to 5.0% by volume of the gaseous chlorinating agent which normally will be dry chlorine. The preferred embodiment of the instant invention involves the use of lower levels of boron chloride combined with lower levels of reductant such that the carbo-chlorination reaction is controlled to provide for the preferential chlorination of alumina over silica and simultaneously give a good yield of chlorinated alumina.

A preferred process sequence utilizing kaolin clay is to initially dry and comminute the clay followed by calcination of the clay in the temperature range of about 700° C to 900° C and in the presence of a properly prepared solid reducing agent, the reducing agent being present in an amount of from about 10% to 40% of fixed carbon, based on the weight of the dry ore. In this way, the solid reductant and the clay are calcined simultaneously. Following calcination, the reaction mixture is then carbo-chlorinated in the temperature range of 600° C to 950° C, using dry chlorine to which is added about 0.3% to 2.5% by volume of boron chloride. The addition of the solid carbon reductant after clay calcination also gives good results, but the solid reducing agent then loses the benefit of the additional calcination that removes water and other objectionable volatile matter.

The most salient feature of the present invention is the fact that carbo-chlorinating the clay in the presence of limited amounts of reducing agent and limited amounts of boron chloride provides for the controlled and preferential chlorination of alumina over silica in kaolinitic ores such that good yields of aluminum chloride are realized while simultaneously maintaining low yields of silicon chloride. In the case of kaolin clay, the yield of aluminum chloride is in the order of 50–90%, while the yields of silicon chloride are generally 0–30%.

The low levels of silicon chloride produced by way of the present discovery results in reduced levels of reducing agent required for kaolin clay chlorination. For example, when carbon is used as the reducing agent, only 5% or less carbon (based on weight of dry clay) is consumed in order to achieve a high yield of aluminum chloride instead of the 30–40% commonly consumed in the prior art when alumina and silica are chlorinated about equally. This substantially reduced carbon consumption is further brought about by the fact the boron chloride catalyzed clay carbo-chlorination of the present invention produces essentially $CO_2$ rather than CO. The permissible use of lower temperature also results in energy savings.

The amount of silica to alumina that is chlorinated can be unexpectedly controlled. The amount of boron chloride added to the chlorine can be increased above about 2.5% and the amount of fixed carbon in reducing agent can be increased above about 20% up to and above 40% until the silica and alumina are chlorinated in about equal amounts.

The boron chloride catalysis in clay carbo-chlorination permits the use of carbon monoxide as the sole reductant. Furthermore, this process can advantageously use high ash coals and cokes, especially lignites, because the process recovers the alumina values in the ash. Moreover, the process can be carried out at essentially atmospheric pressure which represents a preferred embodiment of the present invention. In general, pressures less than 50 psia are satisfactory.

To demonstrate the uniqueness of the present invention, the following working examples are presented using dry kaolin clay containing 37.8% $Al_2O_3$, 43.3% $SiO_2$ 1.5% $Fe_2O_3$, 1.8% $TiO_2$, and 13.6% bound $H_2O$ and wherein all parts are by weight unless otherwise specified. The reactions were typically carried out in either shallow boats or in a fluid bed type of reactor in which the reactant gases were blown through a powder bed. For shallow boat reactions, the reactor consisted of a horizontal 25 mm O.D. fused quartz tube with external heating means into which was placed a shallow quartz boat containing about one gram of reaction mass. Fluid bed reactions were carried out in a 40 mm O.D. vertical quartz tube having a quartz distributor plate and external heating means. Typically, the fluid bed reactions were conducted using about 20 to 40 grams of reaction mass. In both the shallow boat and fluid bed reactions, the chlorination products were collected in cooled condensers downstream of the chlorination reactors. The flow rate of chlorination gases into the reactions was about 250 cc/min. for shallow boats and for the fluid bed reactors.

The following Table I gives the conditions and results of the examples according to the instant invention.

TABLE I

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| | | | CALCINATION | | | | | | | | | CHLORINATION | | | | | | |
| | REACTOR | ADDITIVE | BIN- | TEMP | TIME | CARBON TYPE & % FIXED | PURGE | REACTOR | ADDITIVE | BIN- | CARBON TYPE & % FIXED | TEMP | TIME | GAS FLOW CC/MIN. | | %$BCl_3$/ | % CONVERSION | |
| EXAMPLE | TYPE | & % | DER | °C | MIN. | C | CC/MIN. | TYPE | & % | DER | C | °C | MIN. | Cl | CO | $BCl_3$ | $Cl_3$ | $Al_2O_3$ | $SiO_3$ |
| 1 | Boat | | No | 700 | 60 | None | Ar 200 | Boat | | No | PC | 700 | 30 | 250 | | 0 | 0.0 | 17.0 | 13.7 |
| 2 | Boat | | No | 900 | 20 | none | $CO_2$ 50 | Boat | | Bind | 20 PC | 700 | 30 | 250 | | 1 | 0.4 | 51.4 | 0.0 |
| 3 | Boat | | Bind | 700 | 45 | PC 10 | $CO_2$ 250 | Boat | | No | 10 None | 700 | 30 | 250 | | 10 | 4.0 | 63.2 | 0.0 |
| 4 | Boat | | No | 700 | 45 | None | $CO_2$ 250 | Boat | | No | SBC | 700 | 30 | 250 | | 1 | 0.4 | 78.1 | 40.3 |
| 5 | Boat | | No | 900 | 20 | None | Ar 50 | Boat | | No | 100 PC | 700 | 30 | 250 | | 10 | 4.0 | 96.5 | 99.9 |
| 6 | Fluid | | No | 900 | 20 | None | $CO_2$ 50 | Fluid Bed | | No | 100 None | 900 | 25 | 250 | | 5 | 2.0 | 62.1 | 4.9 |
| 7 | Bed Fluid | | No | 900 | 20 | PC 18.5 | Ar 250 | Fluid Bed | | No | None | 900 | 30 | 250 | | 5 | 2.0 | 65.0 | 14.7 |
| 8 | Bed Boat | | Bind | 750 | 30 | Lignite 10 | Ar 250 | Boat | | No | None | 625 | 45 | 250 | | 5 | 2.0 | 72.1 | 12.0 |
| 9 | Boat | $H_3BO_3$ 1.0 | No | 900 | 20 | None | Ar 200 | Boat | No | PC | | 30 | 250 | | 0 | 0.0 | 69.6 | 12.6 | |
| 10 | Fluid Bed | | No | 700 | 75 | None | Ar 250 | Boat | $B_2O_3$ 2.5 | No | 20 PC 20 | 900 | 30 | 250 | | 0 | 0.0 | 75.1 | 12.4 |

EXAMPLES 1-5

Reference is made to Table I and specifically to Examples 1-5, which were all carried out in shallow boats Dried kaolinitic clay in the amount of about 1.2 grams was calcined in the temperature range of 700° to 900° C for 20 to 45 minutes under a purge of argon (Ar) or $CO_2$. The clay was mixed with petroleum coke (PC) or sub-bituminous char (SBC) in an amount of from 10% to 100% by weight of fixed carbon (dry clay basis) either before calcination or after calcination, but before carbo-chlorination. The resulting clay-carbon mixtures were all carbo-chlorinated at 700° C for 30 minutes under 250 cc/min. flow rate of chlorine and from 0 to 10 cc/min. flow rate of boron trichloride gas.

It has been determined through statistically designed screening tests that the only major effects of variables of those shown in Table I in Examples 1-5 are those due to level of carbon and level of $BCl_3$ added to the reaction and the ratios thereof. Therefore, the other variables, as listed in Table 1, would not significantly affect the results reported in columns 17 and 18. It is thus the purpose of Examples 1-5 to illustrate the singular and conjoint effects of carbon and $BCl_3$ levels upon the chlorination conversion of alumina and silica in clay. Example 1 is presented as being illustrative of a typical prior art reaction mixture containing no $BCl_3$ and 20% fixed carbon by weight of clay (stoichiometric for essentially total conversion of $Al_2O_3$ and $SiO_2$ to form $CO_2$). As can be seen, the reaction resulted in only 17.0% $Al_2O_3$ and 13.7% $SiO_2$ conversions. By comparison in Example 2 and 3, the carbon level was decreased to 10% and, upon the introduction of $BCl_3$ to the chlorination reaction, the level of $Al_2O_3$ conversion increased markedly and the level of $SiO_2$ conversion decreased below the detectable level. Surprisingly, however, in Examples 4 and 5, wherein the carbon level was increased to 100% by weight, the introduction of $BCl_3$ increased the chlorination conversion of both $Al_2O_3$ and $SiO_2$, such that at high levels of $BCl_3$ essentially total clay chlorination was obtained. Thus, based on the data presented in Examples 1-5, it is obvious that $BCl_3$ has a catalytic effect on clay carbo-chlorination and that, through proper control of the levels of $BCl_3$ and carbon added to the reaction, it is possible through unexpected conjoint action to provide for either highly selective chlorination of $Al_2O_3$ over $SiO_2$ or for the total chlorination of both $Al_2O_3$ and $SiO_2$. It is further noteworthy to point out that Examples 4 and 5 the carbon oxide reaction products contained 80-100% $CO_2$ and 20-0% CO.

EXAMPLES 6 and 7

Example 6 illustrates the process of the present invention to achieve selective chlorination of $Al_2O_3$ over $SiO_2$ in clay using a fluid bed type reactor and carbon monoxide as the reducing agent. As can be seen in Table I, chlorine at 250 cc/min., carbon monoxide at 250 cc/min., and $BCl_3$ at 5 cc/min. were mixed and reacted with calcined clay at 900° C for 25 minutes, resulting in 62.1% $Al_2O_3$ and 4.9% $SiO_2$ conversions. Similarly, Example 7 was carried out in a fluid bed reactor, however, using petroleum coke as solid reductant added to the calcination step and resulting in 65.0% $Al_2O_3$ and 14.7% $SiO_2$ conversions. Examples 6 and 7 further illustrate the controlled clay carbo-chlorination obtained through use of moderate levels of reducing agent and $BCl_3$ in the process of the present invention.

EXAMPLE 8

Lignite coal containing about 48% fixed carbon was mixed together with dry clay and a binder to provide 10% fixed carbon by weight of the dry clay. The resulting bound mixture was calcined at 750° C for 30 minutes in a shallow boat and thereafter was carbo-chlorinated at 625° C for 45 minutes, using a 250 cc/min. flow of chlorine and $BCl_3$ at 5 cc/min. The carbo-chlorination reaction resulted in 72.1% $Al_2O_3$ and 12.0% $SiO_2$ conversions and illustrates the combined calcination of clay and coal and the utilization of low reaction temperatures.

EXAMPLES 9 and 10

In practicing the process of the present invention, it may be necessary or desirable to recycle at least part of the $BCl_3$ reaction catalyst in some form other than $BCl_3$. For example, an oxidation or scrubbing step may be used to treat some of the carbo-chlorination reaction off gases containing $BCl_3$, thereby producing either boron oxide or boric acid, which would be recycled to the calcination or carbo-chlorination step. Example 9 illustrates the case in which boric acid is added to the clay before calcination, and Example 10 illustrates the case in which boron oxide is added to the clay after calcination but before carbo-chlorination. As can be seen from the results summarized in Table I, either method of recycling wherein $BCl_3$ is produced in situ during carbo-chlorination of the clay gives controlled chlorination of alumina and silica in the clay.

EXAMPLES 11-15 (see Table II)

In addition to the possible necessity for recycling $BCl_3$ in the form of an oxidation or scrub product, it may also be necessary to provide $BCl_3$ make-up for that $BCl_3$ that is lost during processing. The $BCl_3$ could be produced by chlorinating any suitable boron containing compound and thereafter the $BCl_3$ could be added to the clay carbo-chlorination reaction as needed for make-up. Alternatively, the $BCl_3$ make-up could be produced in situ by adding small amounts of boron compounds to the clay to be carbo-chlorinated. In Examples 11-15, small amounts of the boron compounds listed in Table II were added to clay to provide the equivalent of 2.5% $B_2O_3$ by weight of dry clay.

The clay-boron compound mixtures were prepared, calcined, and carbo-chlorinated in a manner similar to that given for Example 9, and the chlorination results are summarized in Table II.

TABLE II

| Ex. No. | Boron Compound | % Conversion $Al_2O_3$ | % Conversion $SiO_2$ |
| --- | --- | --- | --- |
| 11 | Borax | 64.8 | 33.5 |
| 12 | Boron Sulfide | 72.7 | 29.6 |
| 13 | Boron Phosphate | 64.1 | 7.9 |
| 14 | Calcium Borate | 61.9 | 39.9 |
| 15 | Ammonium Borate | 52.2 | 8.8 |

As can be seen from the above results, the addition of a boron compound to clay carbo-chlorination reaction is a viable method for generating $BCl_3$ is situ and thus providing for the controlled chlorination of alumina and silica in clay. However, these compounds have the disadvantage of consuming chlorine by reaction with the other elements of the compounds.

EXAMPLE 16

Dried clay was calcined in a fluid bed reactor under an air purge at 700° C and was subsequently ground to $-75\mu m + 54\mu m$ particle size. Calcined petroleum coke of the same particle size was ground together with the clay and the resulting mixture was carbo-chlorinated in a shallow boat at 700° C for 160 minutes under a flow of 250 cc/min. chlorine and 5 cc/min. $BCl_3$. Upon analysis, it was found that 91% $Al_2O_3$ and 35% $SiO_2$ had been chlorinated and that, of the 10% by weight of fixed carbon added to the reaction, only 8.1% was consumed.

The present process offers as a distinguishing feature the utilization of relatively short reaction times with the control of and the important reduction in amount of silicon chloride produced hereby and the high efficiency of carbon utilization, renders the present novel process especially attractive commercially for the production of aluminum chloride and subsequently alumina and aluminum from ordinary kaolin clay.

In addition to alumina and silica, other components in clay are also carbo-chlorinated to produce valuable chloride by-products. Specifically, the titania values in clay are chlorinated essentially to completion to produce $TiCl_4$. As was shown in the examples, the chlorination of silica can be maintained at essentially zero, however, at the expense of lower alumina conversions of 50% to 65%. The titania reacted at these alumina conversions is still essentially 100% and thus compensates for any increased materials and handling costs due to the lower alumina production.

The instant invention permits more economical utilization of previously unusuable inexpensive and abundant domestic ores, such as kaolin clay and low grade bauxites containing kaolin clay, whereas the present Bayer alumina process requires very slow (2-3 days) precipitation of alumina in huge tank farms, resulting in large volumes of waste "red mud". All of these disadvantages are over come by the instant invention for producing aluminum chloride, which can simply and economically be oxidized to form alumina. Moreover, by using kaolinitic ores, the titanium value can be recovered along with the aluminum value, thereby freeing two major industries from their traditional dependance on imported ores.

The hardware to perform the instant invention can be batch, semicontinuous or continuous processing apparatus, such as rotary kilns and reactors; fluid, static or moving bed reactors, or horizontal conveyors.

I claim:

1. A process for preferentially chlorinating alumina and suppressing the chlorination of silica in a kaolinitic ore consisting of the steps of: drying and comminuting a kaolinitic ore to form a powdered ore; calcining the powdered ore at a temperature of from about 700° C to 900° C to remove water of composition; and carbo-chlorinating the powdered ore at a temperature of from about 600° C to 950° C to produce aluminum chloride by exposing the calcined ore to a chlorinating agent in the presence of a carbonaceous reductant in an amount of from about 5% to 40% by weight of the dry ore and boron chloride in an amount of from about 0.3% to 4.0% by volume of the chlorinating agent to preferentially chlorinate alumina and suppress chlorination of silica.

2. The process of claim 1, wherein the chlorinating agent is dry chlorine.

3. The process of claim 1, wherein the carbonaceous reductant is selected from the group consisting of petroleum coke, coal coke and lignite char.

4. The process of claim 1, wherein the carbonaceous reducing agent is added to the ore, and the ore and carbonaceous reductant are calcined simultaneously.

5. The process of claim 1, wherein the carbonaceous reductant is carbon monoxide.

6. The process of claim 1, wherein the boron chloride is produced in situ by carbo-chlorination of a boron containing compound selected from the group consisting of boron oxide and boric acid added to the ore.

7. The process of claim 1, wherein the amount of the carbonaceous reductant is from about 5% to 20% by weight of the dry one.

8. The process of claim 1 wherein the boron chloride is produced in situ by carbo-chlorination of a boron containing compound selected from the group consisting of boron sulfide, boron phosphate, calcium borate and ammonium borate added to the ore.

* * * * *